(No Model.)

A. L. DANIELS.
UNDERGROUND CONDUIT FOR ELECTRIC WIRES.

No. 599,292.          Patented Feb. 15, 1898.

Witnesses:

Inventor:
Adelbert L. Daniels;
By Humphrey & Humphrey,
Attys.

UNITED STATES PATENT OFFICE.

ADELBERT L. DANIELS, OF NORTH EAST, PENNSYLVANIA, ASSIGNOR TO THE H. B. CAMP COMPANY, OF AULTMAN, OHIO.

UNDERGROUND CONDUIT FOR ELECTRIC WIRES.

SPECIFICATION forming part of Letters Patent No. 599,292, dated February 15, 1898.

Application filed December 22, 1897. Serial No. 663,075. (No model.)

*To all whom it may concern:*

Be it known that I, ADELBERT L. DANIELS, a citizen of the United States, residing at North East, in the county of Erie and State of Pennsylvania, have invented a certain new and useful Improvement in Underground Conduits for Electric Wires, of which the following is a specification.

My invention has relation to improvements in that class of underground conduits for electric wires in which the outer shell of the conduit is of iron. In the use of such conduits some difficulty has been found in securing perfect, continuous, and permanent insulation between the conduit and the wires, and as a result leaks are not uncommon, to the detriment of the service. The object of my invention is to overcome this difficulty by providing a new and improved conduit that shall embody all the advantages of the metal pipe and avoid the defects.

To the aforesaid object my invention consists in the peculiar and novel construction, arrangement, and combination of parts hereinafter described, and then specifically pointed out in the claims, reference being had to the accompanying drawings, forming a part of this specification.

Figure 1:
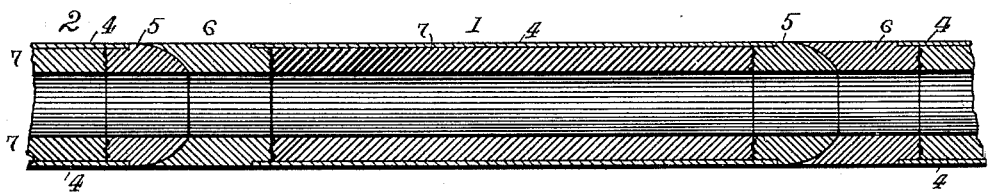
Figure 2:
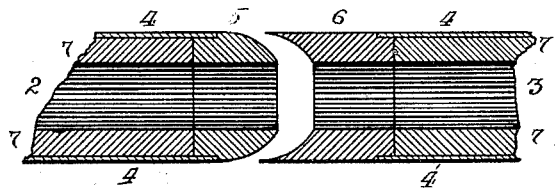

In the accompanying drawings, in which similar reference-numerals indicate like parts in both views, Figure 1 is a central section of one of my improved pieces of conduit and portions of two other pieces joined with it, and Fig. 2 shows the ends of two sections slightly separated.

Referring to the drawings, 1 represents a section or piece of my improved conduit, and 2 and 3 portions of two adjacent and contiguous sections, all in central longitudinal sectional views. Each section has an outer case 4, of sheet or cast metal, and in one end of each section is a collar or ring 5, of glass, terra-cotta, earthenware, or like insulating material, having its inner end reduced or rabbeted a part of its length to receive the metallic case and its outer end spherical or convex in continuous outline. In the opposite end of each section is a like ring 6, of similar material, rabbeted to partially enter the case 1, but having its outer end concave to fit the convex end of an adjacent pipe. The inner ends of these rings 5 6 are corrugated to form a more secure joint with the lining of the case, and the inside of the case is lined with a coating 7 of cement or like material, having its interior coincident with the interior of the rings 5 6. By this arrangement the ends are prevented from disintegration and the wires perfectly insulated from the metal case, while the peculiar faces of the insulating ends permit a close joint to be made.

I claim as my invention—

1. An improved conduit for underground electric wires, consisting of sections having a metal case, with ends of insulating material of less internal diameter than the case, the ends of adjacent sections conformed to fit together, and a lining of insulating material connecting said ends, substantially as shown and described.

2. In a conduit for underground electric wires, the combination with a metallic case, of rings of insulating material of less internal diameter than said case, rabbeted to fit said case, and having their inner ends corrugated, their outer ends being alternately concave and convex and a lining of cement uniting said rings, and of like internal diameter, substantially as shown and described.

3. In a conduit for electric wires the combination with a metallic pipe, of ends of terra-cotta or like insulating material of like outside and less internal diameter, connected with said pipe and a lining in said pipe between said ends of insulating material and of like internal diameter, substantially as shown and described.

In testimony that I claim the above I hereunto set my hand.

ADELBERT L. DANIELS.

In presence of—
C. P. HUMPHREY,
C. E. HUMPHREY.